United States Patent [19]

DuVal

[11] 4,433,463

[45] Feb. 28, 1984

[54] MULTIPURPOSE PRYING TOOL

[75] Inventor: Alvin J. DuVal, Waukesha, Wis.

[73] Assignee: William Diedrich, Waukesha, Wis. ; a part interest

[21] Appl. No.: 417,714

[22] Filed: Sep. 13, 1982

[51] Int. Cl.³ .............................................. B23P 19/04

[52] U.S. Cl. ........................................ 29/239; 29/253; 29/254; 254/104

[58] Field of Search .................. 254/104; 29/239, 253, 29/267, 254; 144/193 C; 294/94, 95; 269/237-239, 229, 235, 236

[56] References Cited

U.S. PATENT DOCUMENTS

| | | | |
|---|---|---|---|
| 1,219,398 | 3/1917 | Huntsman | 294/94 |
| 1,624,243 | 4/1927 | Hoff et al. | 254/104 |
| 2,259,932 | 10/1941 | Hejduk et al. | 254/104 |
| 2,464,103 | 3/1949 | Swenson | 29/239 |
| 2,561,196 | 7/1951 | Gauthier | 269/238 |
| 3,021,112 | 2/1962 | Forman | 254/104 |
| 3,309,764 | 3/1967 | Klatt | 29/239 |
| 3,574,381 | 4/1971 | Ocheltree | 294/94 |

FOREIGN PATENT DOCUMENTS

| | | | |
|---|---|---|---|
| 381739 | 9/1962 | Fed. Rep. of Germany | 254/104 |

*Primary Examiner*—Robert C. Watson

*Attorney, Agent, or Firm*—Wheeler, House, Fuller & Hohenfeldt

[57] ABSTRACT

A flat strip of metal formed as an expandible wedge having an inside triangular space bounded by jaws that correspond to the beveled sides of the wedge and a rear portion that corresponds to the thick end of the wedge opposite from its apex. The apex ends of the jaws are sharpened. A shaft extends through a hole in the rear portion of the wedge and has an eccentric inside of the triangular space. The shaft has a projection that is larger than the hole and can be reciprocated for the projection to drive the wedge and can be turned for the eccentric to spread the jaws.

8 Claims, 7 Drawing Figures

MULTIPURPOSE PRYING TOOL

BACKGROUND OF THE INVENTION

This application is a substitute for application Ser. No. 180,827, filed Aug. 25, 1980 and now abandoned.

The invention disclosed herein is a prying tool in the form of an expandible wedge which is useful in many ways and is especially useful for prying woodwork such as baseboards, molding and window frames from walls and ceilings.

Often it is necessary to remove woodwork from walls or ceilings with the least amount of damage to either. A common method of removing woodwork that has been nailed to walls or ceilings is to drive a tool such as a chisel or the beveled tip of a pry bar between the woodwork and wall and use the tool as a lever for forcing the woodwork away. These prior art methods usually result in some gouging, nicking and indentation of the woodwork and structure to which it is attached and this damage is time-consuming and expensive to repair. Since these tools are used as levers they must be quite thick to avoid bending. The great thickness and direct application of the prying force to the wall and woodwork makes doing damage highly probable. In many cases it is impossible to restore the woodwork to a reusable condition.

SUMMARY OF THE INVENTION

The purpose of the new prying tool described herein is to permit parting members that are firmly joined together such as woodwork and wall without damaging either member.

Further objects of the invention are to provide a prying tool that is light, compact, easy to carry and simple to use.

Another object is to provide a tool that is thin and easy to insert between members that are to be parted.

A very important object is to provide a tool wherein the highest force concentration for effecting separation of members is applied to parts of the tool itself while at the same time the force applied by the tool to the members is more distributed so the likelihood of the tool indenting the members is minimized.

Briefly stated, a preferred embodiment of the new prying tool comprises an expandable wedge. The wedge is formed from a thin flat metal strip. Basically, two flat jaws are bent in the same direction at more than a right angle away from a section of the strip that is centered between its ends. Bending is continued until the free ends or tips of the longitudinally extending jaws contact each other and form the apex or point of the wedge. The central section of the bent strip remains as the thicker or rear part of the wedge. The tips of the jaws are sharpened either before or after the bending operation. The wide rear part of the wedge is provided with a hole through which a rod or shaft extends longitudinally into the triangularly shaped space between the jaws. There is a cam or eccentric element on the shaft. When the eccentric element is sufficiently retracted by the shaft toward the rear of the wedge or when the element is in one of its possible angular or rotational positions it does not spread the sharpened tips of the jaws apart at the apex so the wedge can be driven and inserted with the least resistance between the members that are to be parted. After the wedge is driven between the members, the shaft is turned to cause the eccentric element to turn through a range of angular positions wherein it reacts against or effects a camming action on the insides of the jaws to thereby spread them and cause the members to separate.

In the preferred embodiment of the tool, the shaft has a right angular bend external to the thick or rear end of the wedge that serves as a lever for cranking or turning the eccentric element. The shaft also has a radial projection such as a cross-pin or a staked region having a diameter greater than the hole in the thick rear of the wedge through which the shaft passes. This is for facilitating driving the wedge initially between the members that are to be separated. The shaft can be retracted by use of the handle which is on the lever and can then be rammed forward repeatedly so the projection on the shaft imparts impulses or hammer-like blows to the rear of the wedge for driving it between the members.

How the above-mentioned and other objects of the invention are achieved will be evident in the more detailed description of a preferred embodiment of the invention which will now be set forth in reference to the drawing.

DESCRIPTION OF THE PREFERRED EMBODIMENT

Figure 1:
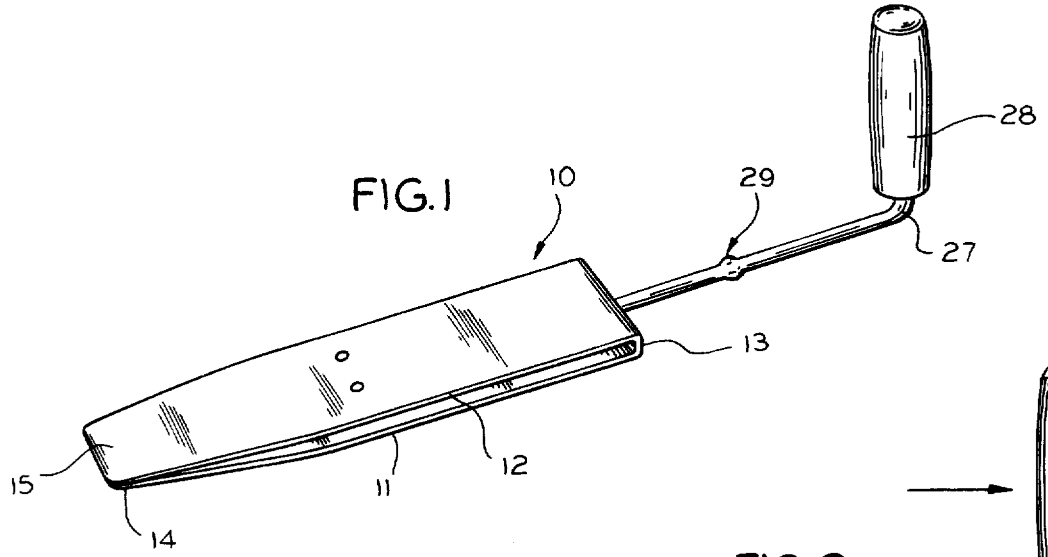
FIG. 1 is a prespective view of the expandible wedge prying tool.
Figure 2:
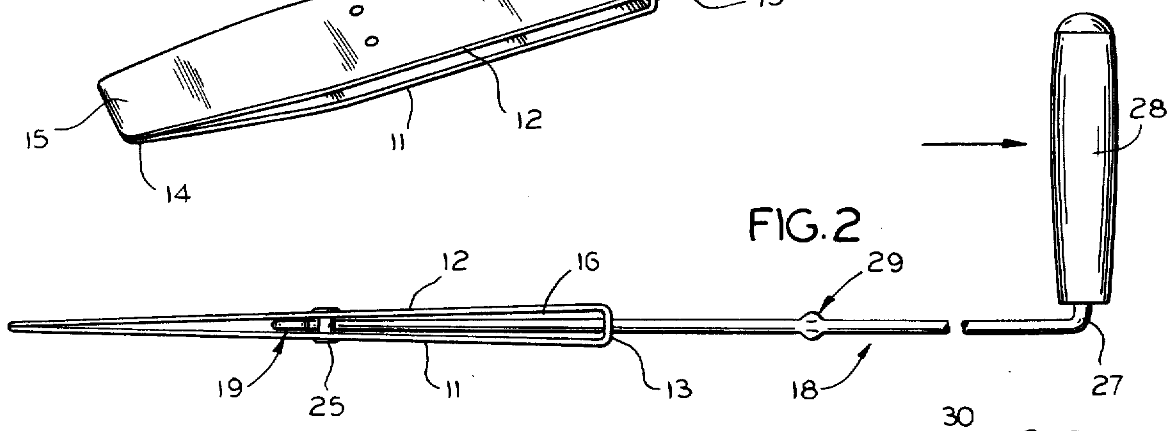
FIG. 2 is a side view of the tool as it appears before it is inserted between members that are to be parted.
Figure 4:
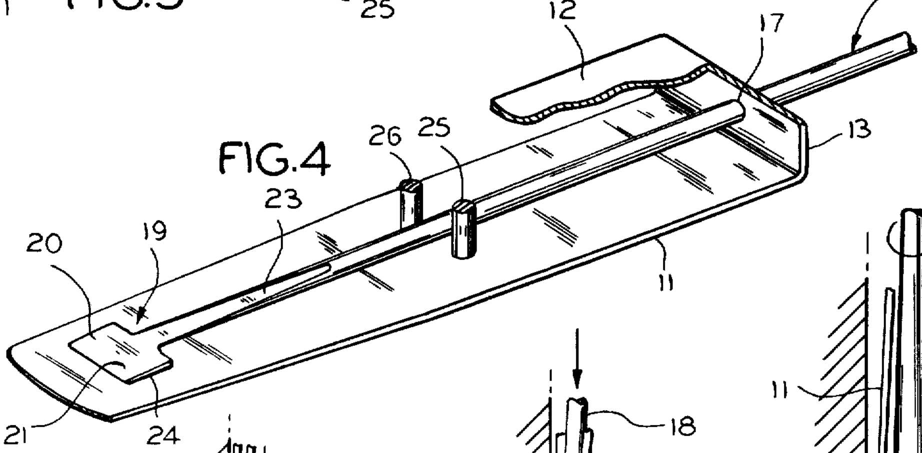
FIG. 4 is a perspective view of the expandible wedge with one of the jaws broken away to reveal the interior of the wedge.

Referring to FIGS. 1, 2 and 4, the expandible wedge 10 is bent from a single strip of resilient or flexible material such as a metal so it has two longitudinally extending blades or jaws 11 and 12 and a thick rear portion 13. Steel is a suitable material but other resilient materials such as plastic can be used. The jaws 11 and 12 are bent slightly more than 90° from the plane of the rear portion 13 so the free ends or tips 14 and 15 of the jaws will contact each other without flexing the jaws. The point or line along which the jaw tips contact each other constitutes the apex of a triangle or wedge whose inclined sides are the jaws 11 and 12 and whose base is the thick rear portion 13 from which the jaws project integrally. The jaw tips 14 and 15 are thinned down or sharpened to make it easier to insert or drive the wedge between members such as a wall and a length of woodwork that is to be removed from the wall.

As can be seen particularly well in FIG. 2, the interior surfaces of jaws 11 and 12 and the rear portion 13 of the wedge provide a space 16 between the jaws which is triangular or uniformly tapered when the expandible wedge is in an unexpanded condition. As is clearly evident in FIG. 4, there is a bearing hole 17 in the rear portion 13 of the wedge. A round rod or shaft 18 extends through and is slidably reciprocable longitudinally and rotatable in the hole. Shaft 18 has a part at its inside end formed in a manner to provide a cam or eccentric element that is designated generally by the numeral 19. The eccentric element has two wings or lobes 20 and 21 which extend radially away from the axis of the shaft 18. The end of the shaft is tapered in the region 23 and the taper is confluent with the cross-sectional taper of eccentric element 19. An eccentric element that has only one lobe 21 extending away from the shaft could be used. It is only necessary that there be a cam surface such as the edge 24 of lobe 21 in FIG. 4 which is eccentric or radially spaced from the shaft 18 axis so that when torque is applied to the shaft the eccentric will cam or react against at least one jaw to expand or spread the jaws from each other and, hence, force the woodwork, for example, away from a wall or the like.

There are two laterally spaced apart posts 25 and 26 which span between jaws 11 and 12 and have their ends passing through the jaws. In an actual embodiment, the posts are rivets 25 and 26 and they are peened to make their ends as flush or smooth as possible with the outside surfaces of jaws 11 and 12. The posts could be spot welded to the jaws. The rivets have several purposes. For one thing, they determine the fulcrum at which the jaws will deflect when the eccentric element 19 is rotated to spread them. They are also spaced apart appropriately for confining and guiding the rotatable and reciprocable shaft 18 along a straight line of action in conjunction with bearing hole 17. Another purpose of the rivets is to provide a stop against which the eccentric element 19 can abut for limiting the amount by which the shaft 18 can be retracted longitudinally toward the rear of the wedge.

Figure 3:
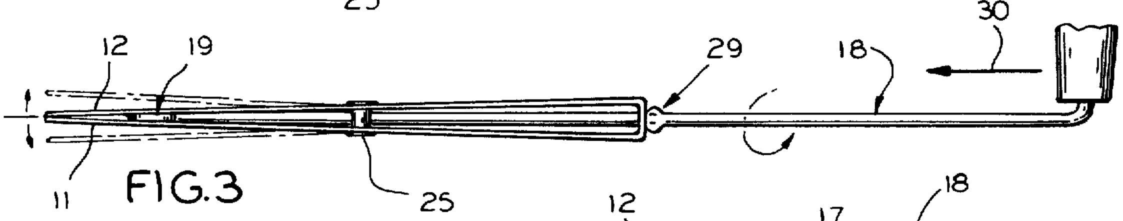
FIG. 3 is similar to FIG. 2 except that it shows in phantom lines the position which the separated jaws of the tool attain after the eccentric element has been actuated.

As shown in FIGS. 1, 2 and 3 the outermost end of shaft 18 has a right angularly bent portion 27 which serves as a lever for turning the shaft and, hence, actuating the eccentric element in either direction of rotation. A handle 28 is fitted on the shaft portion 27 to make it more comfortable for the user to distribute force over a greater area of the user's hand when the shaft is rammed forwardly to insert or start entry of the jaw tips 14 and 15 between the members that are to be parted.

In accordance with the invention, the described tool is a combination of an expandible wedge and a wedge inserting or driving means. In other words, no separate tool such as a hammer is required to insert the wedge. For the purpose of driving the wedge the preferred embodiment of the shaft 18 is staked to provide a projection at a place 29 outside of the rear 13 of the wedge. A projection such as a collar or cross-pin, not shown, could be used in place of the stake 29. In any event, the shaft 18 is retracted and the radially projecting stake 29 is spaced rearwardly of the rear 13 of the wedge as in FIGS. 1 and 2 in preparation for driving the wedge. Then the shaft 18 is manually rammed forward in the direction of arrow 30 for the projection 29 which is larger than hole 17, to impart an impulse or hammer-like blow to the rear 13 of the wedge as in FIG. 3 for driving the thin sharpened apex end of the wedge between the members that are to be separated. During the driving strokes, the shaft is in a rotational position as in FIGS. 2 and 3 which keeps the eccentric 19 unturned as in those FIGURES so the jaws 11 and 12 will not yet be deflected or spread apart to the positions in which they are shown in phantom lines in FIG. 3.

Figure 5:
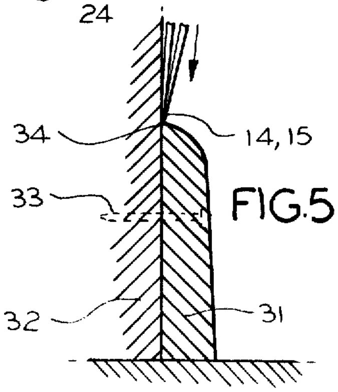
FIGS. 5, 6 and 7 illustrate the steps involved in prying two objects apart with the expandible wedge.
Figure 6:
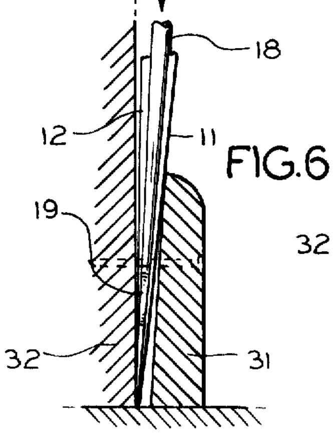
Figure 7:
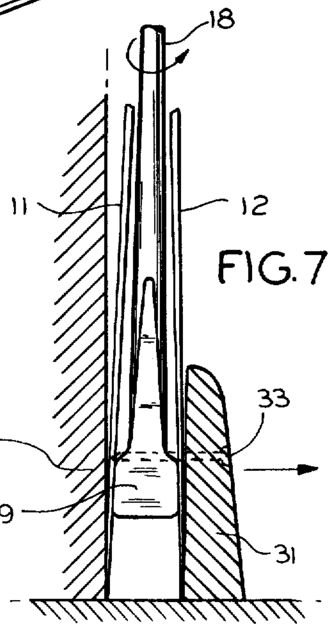

FIGS. 5–7 illustrate the operational sequence of the self-contained wedge and wedge driver in a case where woodwork in the form of a baseboard 31 is to be removed from a wall 32 to which it has been fastened periodically along its length by means of nails 33. The first step is to set the sharpened tips 14 and 15 of the wedge jaws, that is, the apex of the wedge at the top 33 of the joint 34 at which the woodwork and wall interface as in FIG. 5. One hand of the user can grip the wedge itself at this time for steadying and aiming it and the other hand can be gripping the handle 28. Then the shaft 18 is alternately retracted to its outer limit as in FIG. 2 and rammed forwardly repeatedly to a position corresponding to FIG. 3 to impart the impulses to the wedge for driving it in between the wall 32 and baseboard 31 as in FIG. 6. After the wedge is driven part of the distance or all of the distance along the interface of the wall and baseboard as in FIG. 6, shaft 18 is turned using lever handle 28. This rotates the cam or eccentric element 19 to the angular position in which it finally arrives as depicted in FIG. 7. Rotation of the eccentric element 19 produces a camming action between its edges and the jaws 11 and 12 for spreading the jaws and causing the woodwork member to separate from the wall member as in FIG. 7.

It is worthy to observe that although the edges of the camming eccentric element 19 applied a concentrated force over a small area on the insides of the jaws during rotation which would damage a wall or woodwork if applied directly thereto as with formerly used tools such as chisels and pry bars, with the new tool the force is transmitted to the wedge jaws and distributed over a large area so indentation of the members being separated will not occur.

Removing woodwork with the new expandible wedge and driver combination as described herein is only one use of the tool that was chosen to facilitate illustrating its construction and operation. It should be appreciated, however, that the tool can be used in a variety of situations where spreading any two members apart is desired.

Although a preferred embodiment of the invention has been described in considerable detail, such description is intended to be illustrative rather than limiting, for the invention may be variously embodied and is to be limited only by interpretation of the claims which follow.

I claim:

1. A tool for prying objects apart, comprising:

a strip of resilient flexible material formed as a wedge comprised of a rear portion corresponding to the thick end of the wedge and two flexible jaw portions forming the sides of the wedge and extending longitudinally and integrally from said rear portion and converging continuously from said rear portion so the free ends contact to form the thin edge of the wedge, a shaft passing slidably and rotationally through said rear portion for extending between said rear portion for extending between said jaw portions and an eccentric element rotatable with the shaft between said jaw portions, said eccentric element having a rotational position where it exerts no force on said sides for allowing the free ends of said jaws to contact under the influence of the resilience of said sides for facilitating insertion of the thin end of the wedge between objects that are to be parted by applying a driving force to the thick end of the wedge and said eccentric element being rotatable by means of said shaft to other positions wherein it forces said jaw portions to separate to cause parting of the objects.

2. A tool for prying objects apart, comprising:

a strip of flexible material formed as a wedge comprised of a rear portion corresponding to the thick end of the wedge and flexible jaw portions forming the sides of the wedge and extending longitudinally and integrally from said rear portion and converging so their free ends can contact to form the thin edge of the wedge, a rotatable shaft passing through said rear portion for extending between said jaw portions and an eccentric element rotatable with the shaft between said jaw portions, said shaft being freely slidable through said rear portion between advanced and retracted positions and a projection on said shaft outside of the rear portion of the wedge, retraction of the shaft causing said projection to be spaced from said rear portion and advancement of the shaft causing the projection to impact said rear portion for driving the wedge between objects, said eccentric element having a rotational position wherein it allows the free ends of said jaws to contact for facilitating insertion of the thin end of the wedge between objects that are to be parted and said eccentric element being rotatable by means of said shaft to other positions wherein it forces said jaw portions to separate to cause parting of the objects.

3. A tool for prying objects apart comprising:

a strip of metal formed as a wedge comprised of a rear portion corresponding to the thick end of the wedge and flexible jaw portions forming the sides of the wedge and extending longitudinally and integrally from the rear portion and converging so their free ends can contact to form the thin edge of the wedge, said jaw portions and rear portion defining a space that tapers from the rear portion toward said thin edge of the wedge, a shaft extending through said rear portion and into the space between said jaw portions, said shaft being slidable longitudinally and rotatable in said rear portion, a cam element disposed between said jaw portions and rotatable and slidable with the shaft, said cam element having a rotational position wherein it allows the free ends of said jaw portions to contact for facilitating insertion of the thin end of the wedge between objects that are to be parted and said cam being rotatable to other positions wherein it forces said jaw portions to separate for parting of the objects, means on the shaft providing a lever for rotating the shaft, guide means disposed between said jaws in spaced relationship with said rear portion for guiding said shaft longitudinally, and a projection on said shaft outside of the rear portion of the wedge so that when said shaft is slid rearwardly said projection will be spaced from said rear portion and when slid forwardly said projection can impact said rear portion for inserting the wedge between objects when said cam is in a position that allows said free ends to contact after which said cam may be rotated to another position wherein it forces said jaws to separate and cause parting of the objects.

4. The tool as in claim 3 wherein said cam is formed from said shaft and has at least one radially extending lobe for reacting against a jaw portion and said lobe is tapered substantially corresponding with the taper of the jaw portions.

5. The tool as in claim 3 wherein said guide means are laterally spaced apart posts between which said shaft passes.

6. The tool as in claim 5 wherein said posts have one end attached to one of the jaw portions and the other end attached to the other of the jaw portions.

7. The tool as in claim 6 wherein said posts are comprised of rivets.

8. The tool as in claim 3 wherein said guide means are laterally spaced apart posts between which said shaft passes and said posts are sufficiently close together for being struck by said cam to thereby limit the rearward motion of said shaft.

* * * * *